United States Patent
Asarikuniyil (10) Patent No.: US 9,979,926 B1
(45) Date of Patent: May 22, 2018

(54) DYNAMIC SEGMENT SLICING FOR FASTER VIDEO PLAYBACK

(71) Applicant: The DIRECTV Group, Inc., El Segundo, CA (US)

(72) Inventor: Binny Asarikuniyil, Los Angeles, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 241 days.

(21) Appl. No.: 14/734,329

(22) Filed: Jun. 9, 2015

(51) Int. Cl.
| | |
|---|---|
| *H04N 5/445* | (2011.01) |
| *H04N 5/93* | (2006.01) |
| *G06F 3/0484* | (2013.01) |
| *H04L 29/06* | (2006.01) |

(52) U.S. Cl.
CPC .......... *H04N 5/93* (2013.01); *G06F 3/04842* (2013.01); *H04L 65/60* (2013.01)

(58) Field of Classification Search
CPC ................................................. H04N 21/2662
USPC ............................................................ 725/49
See application file for complete search history.

(56) References Cited

U.S. PATENT DOCUMENTS

| | | | |
|---|---|---|---|
| 2010/0080290 A1* | 4/2010 | Mehrotra | H04N 19/147 375/240.07 |
| 2013/0232233 A1* | 9/2013 | Reza | H04N 21/84 709/219 |
| 2013/0235152 A1* | 9/2013 | Hannuksela | H04N 19/00769 348/43 |

* cited by examiner

*Primary Examiner* — Michael Hong
(74) *Attorney, Agent, or Firm* — Gates & Cooper LLP (57) ABSTRACT

A method, system, computer program product, and computer readable storage medium provide the ability to control media content playback and reduce the time to commence playback of streamed media content. A client application receives a playback request to initiate playback of the media content. The client application downloads, from a server, a segment of the media content. The client application slices the segment into multiple smaller segments. The client application provides a subset of the multiple smaller segments to a video player. The subset of multiple smaller segments enable the video player to commence playback of the media content.

21 Claims, 8 Drawing Sheets

DYNAMIC SEGMENT SLICING FOR FASTER VIDEO PLAYBACK

BACKGROUND OF THE INVENTION

1. Technical Field

Embodiments of the present invention relate generally to controlling media content playback, and in particular, to a method, system, apparatus, article of manufacture, and computer program product for improving video playback time by dynamically slicing video segments on a client.

2. Description of the Related Art

Media content is often streamed to devices such as computers (desktop or laptop), tablet computers, cellular phones, set top boxes, etc. However, when streaming, a sufficient amount of content must be downloaded into the playback device before playback can begin. The amount of time it takes to download such content is dependent on the connection speed resulting in significant delays/wait times before a user is able to actually view content. Accordingly, it would be beneficial to provide a mechanism to improve the delay/wait time between when media content playback is requested and when playback actually commences. To better understand the invention, a description of prior art media content playback may be useful.

Media content/video sources to be streamed are structured in predefined chunks that are also known as segments/fragments. When the user initiates a video playback, the player fetches a few segments and starts the playback. Different players fetch different numbers of chunks at different time intervals. However, in most players, at least two segments are required to be fetched before the actual playback begins. Accordingly, wait time for the user is directly proportional to the time taken to download the two segments. As an example, in the HTTP (hyper text transfer protocol) live streaming (HLS), the segment size is typically predefined for ten (10) seconds of playback time. At a download speed of 5 mbps (megabytes per second), client devices may take approximately 3 seconds to download each segment. Accordingly, it takes almost six (6) seconds just to download the two segments.

Prior art systems have attempted to reduce the size of the segment. However, there is a tradeoff between the start time and the frequency of network calls. In this regard, if the size is made too small, the frequent network calls to download the chunks will degrade the performance of the server. If the size is too big, the initial delay may be unacceptably long.

In view of the above, it is desirable to decrease the delay time between the receipt of a playback request and commencement of playback while minimizing network calls.

SUMMARY OF EMBODIMENTS OF THE INVENTION

Embodiments of the invention overcome the problems of the prior art by a client application dynamically slicing the first segment needed to initiate a playback into multiple segments that are then provided to a video player. As a result, the player receives the requisite two segments/chunks and can initiate playback in an expedited fashion without increasing the number of network requests.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide an improved method for commencing playback of media content. A client application serves as an interface between the video player and the server that delivers content. The client application receives a video player request to initiate playback with content requested from a server/content delivery network (CDN). The client application downloads a first segment and dynamically slices such content into multiple slices and provides such slices to the video player. Such slicing permits the video player to initiate playback without requiring large chunks of data. Once playback has commenced, the original size segments may be requested and utilized.

Embodiments of the invention may be utilized on any type of device that plays back content that is streamed to a user. In particular, devices that may be utilized within the scope of embodiments of the invention include cellular phones (e.g., iPhones™, Android™ based devices, etc.), tablet computers/devices (e.g., iPads™, Android™ based devices, Windows™ based devices, etc.), desktop/laptop computers, set top boxes (STB) that receive streamed content, etc. To provide a better understanding of potential implementations/environments, set forth below are descriptions of a computer hardware/software including a network, and a satellite television distribution system and its components.

Hardware Environment

Figure 1:
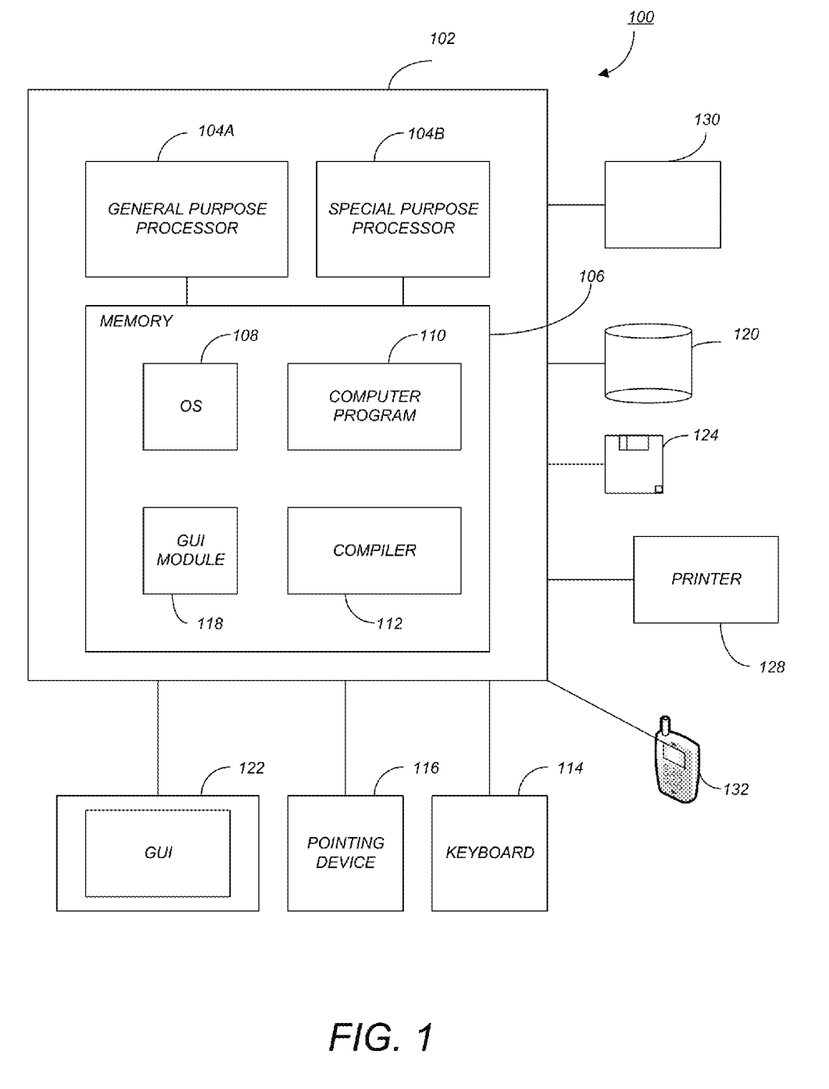
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™ Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102, either via a wired connection or wirelessly.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to embodiments the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
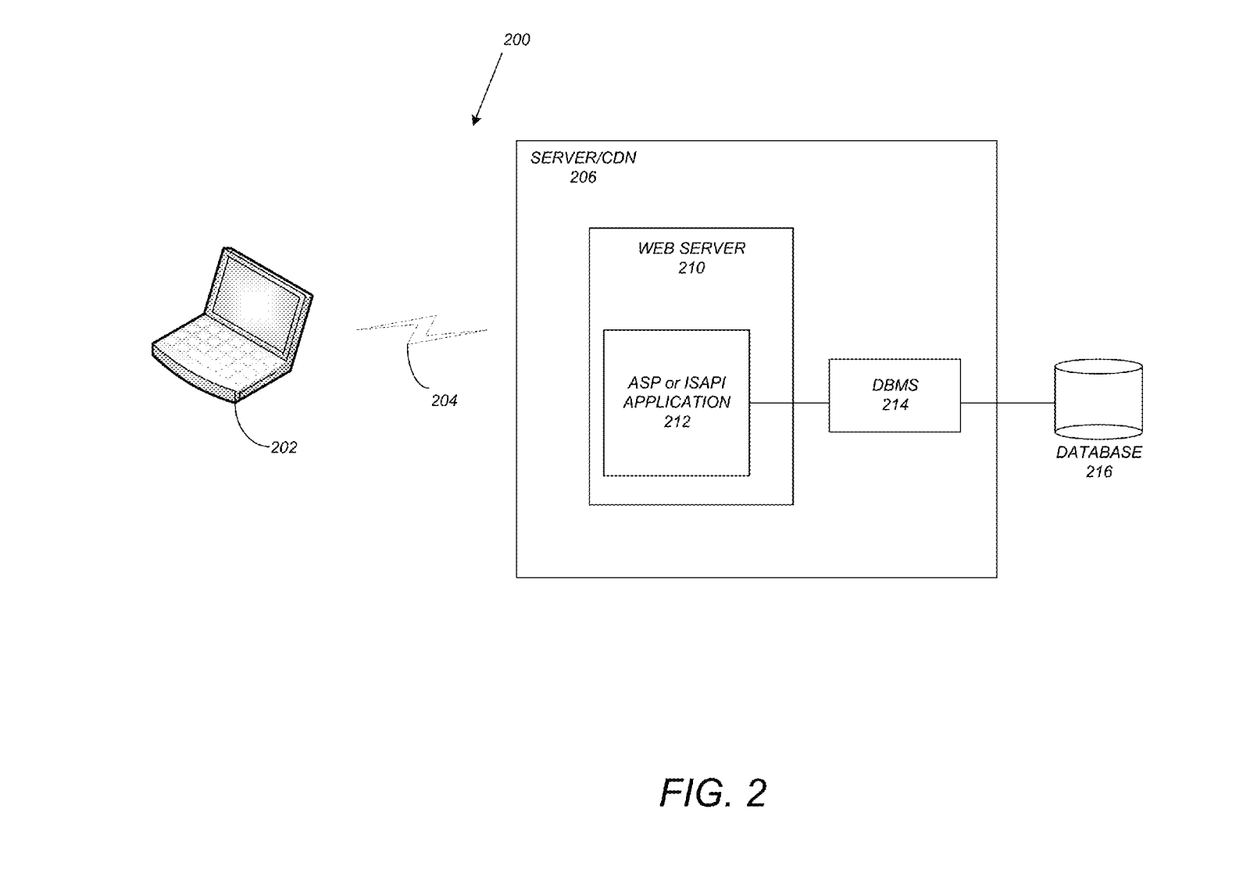
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. As used herein, server computer 206 may also include and/or correspond to a content delivery network (CDN) that consists of multiple servers deployed in multiple data centers across a network. The goal of a CDN is to serve content to end-users/clients 202 with high availability and high performance. CDNs serve a large fraction of the Internet content today including media content such as video, audio, etc., live streaming media, on-demand streaming media, etc.

A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers/CDNs 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers/CDN 206 in accordance with embodiments of the invention.

A network 204 such as the Internet connects clients 202 to server computers 206. Network 204 may utilize Ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. Applications executing on client 202 within or under the control of a web browser may be referred to herein as a web application, web app, or "app". In addition, the term "app" may also include any application executing on a thin client device (e.g., a tablet computer such as an iPad™, cellular phone, etc.). The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Accordingly, embodiments of the invention may be implemented as a software application on a client 202 or server computer 206. Further, as described above, the client 202 or server computer 206 may comprise a thin client device or a portable/cellular device that has a multi-touch-based display.

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Figure 3:
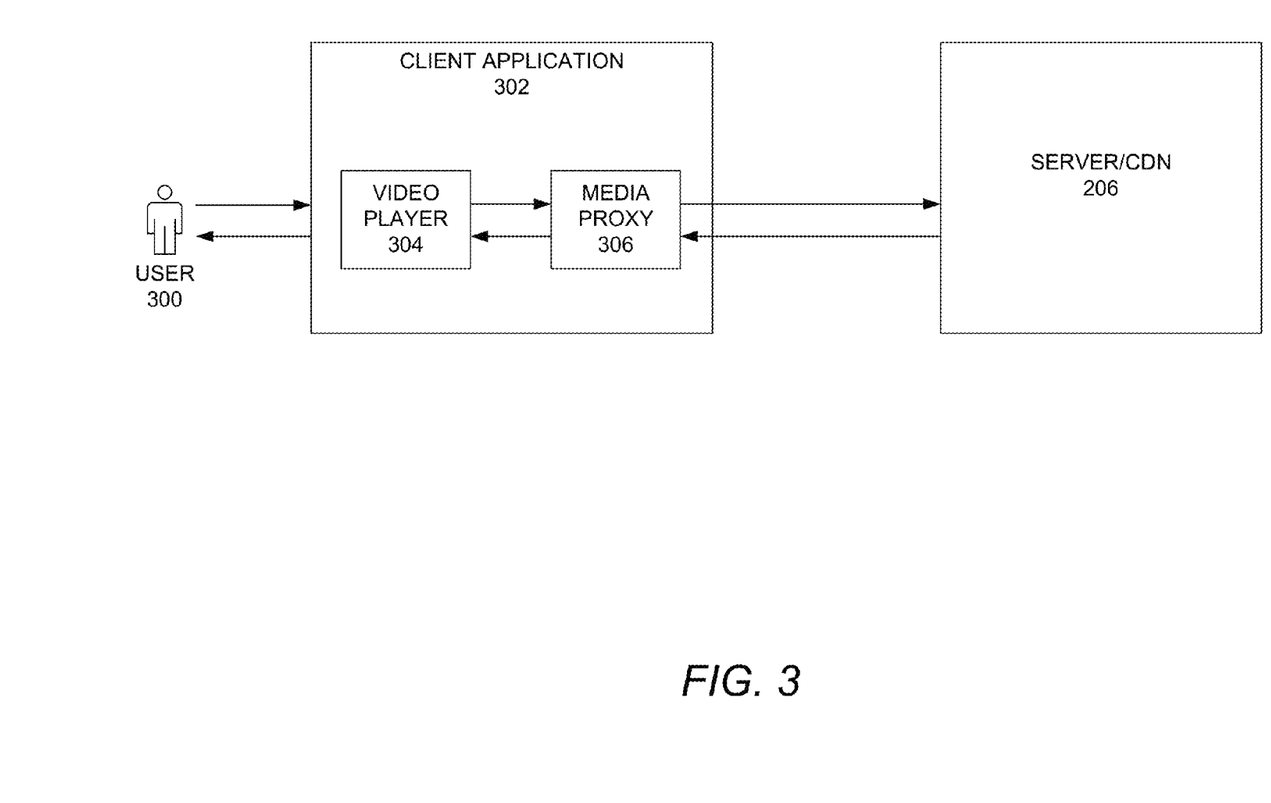
FIG. 3 illustrates an overview of the environment and various components that may be utilized to perform the dynamic slicing to improve playback in accordance with one or more embodiments of the invention.

Dynamic Segment Slicing to Improve Playback Delay without Causing Network Overload Environment/System Overview FIG. 3 illustrates an overview of the environment and various components that may be utilized to perform the dynamic slicing to improve playback in accordance with one or more embodiments of the invention. The user 300 interacts with client application 302 that is executing within a client computer 100/202 (e.g., a laptop/desktop computer, tablet computer, cellular device, personal digital assistant, media playback device, set top box, etc.). Client application 302 consists of the video player 304 and the media proxy 306 that perform various functions as set forth in further details below. The media proxy 306 communicates with the server/CDN 206 (e.g., via an IP [Internet Protocol] network) to request and retrieve media content via streaming.

As described above, in the prior art a user 300 would initiate playback of media content/video that is structured in chunks of a predefined size. Further, video players 304 typically require at least two (2) chunks/segments to be completely downloaded (i.e., from server/CDN 206) prior to commencing the playback operation.

In contrast to the prior art, embodiments of the invention override the predefined chunk size to help fasten the video playback. Whenever a user 300 initiates a playback, the video player 304 is given the smallest chunk size that can start the playback. This size could be one fifth of the original chunk size. In this manner, smaller chunks can be downloaded faster and playback can begin faster. Once the playback begins, the chunk size is increased to reduce the number of network calls (i.e., to the server/CDN 206). Further, to provide the smaller chunk, the media proxy 306 slices a larger chunk in real time (i.e., on the client device side 302) with negligible added overhead. Further, the slicing of the predefined chunk is performed dynamically in real time by adjusting the byte range of the chunk requested (thereby eliminating any need to have an expensive algorithm at the streaming source [e.g., the server/CDN 206]).

Details for Controlling Media Content Playback

Figure 4:
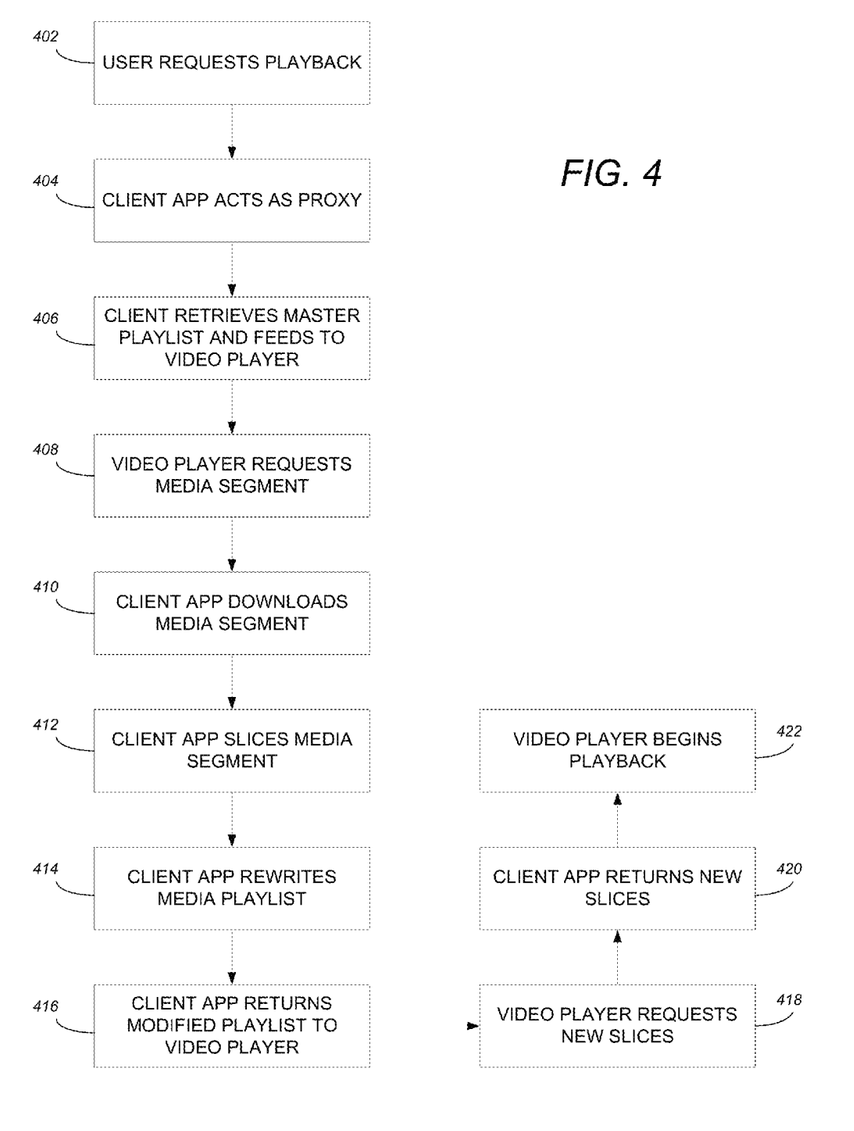
FIG. 4 illustrates the execution flow for playing back media content in accordance with one or more embodiments of the invention.

FIG. 4 illustrates the execution flow for playing back media content in accordance with one or more embodiments of the invention. The execution flow of FIG. 4 will be described while referencing the workflow illustrated in FIGS. 5A-5C.

Figure 5A:
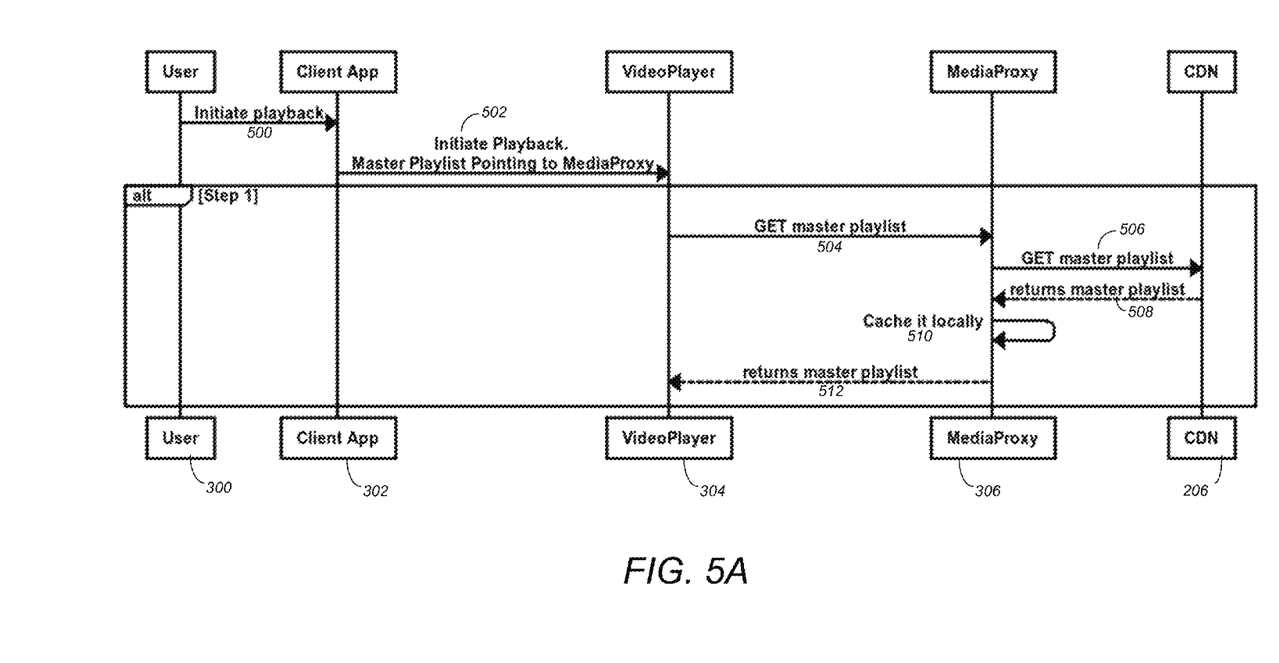
FIG. 5A illustrates the workflow for initiating playback of video content through the retrieval of the master playlist (steps 402-406 of FIG. 4) in accordance with one or more embodiments of the invention.

FIG. 5A illustrates the workflow for initiating playback of video content through the retrieval of the master playlist (steps 402-406 of FIG. 4) in accordance with one or more embodiments of the invention. Referring to both FIG. 4 and FIG. 5A, at step 402/500, a user 300 makes a request to start/initiate playback. Such a playback request is made to a client application 302 (e.g., a DirecTV™ application or other app that serves as an interface to the user). Further, the request may be initiated when a user 300 requests any content that is required to be downloaded and/or received across a network. For example, such a request may include a user 300 changing and/or tuning into a channel (e.g., a live channel) within a client application 302, requesting an on-demand program, etc. Similarly, a user 300 may initiate a request from within a web browser by clicking on a hyperlink, selecting video/audio content/channel, etc.

As described above, the client application 302 includes both the video player 304 and the media proxy 306, and the user does not directly interact with either the video player 304 or media proxy 306 but instead is only permitted to directly interact with the client app/application 302. In this regard, at step 404, the client application 302 acts as a proxy to all network requests (e.g., made by the user 300) to/from the video player 304. For example, the user may be interacting with the client application 302 and selects particular media content (e.g., a movie or episodic) to view. In the prior art, the video player 304 would receive such a selection/request and all requests for the actual media content would be controlled by the video player 304. At this stage, the media selection indicates a request for a master playlist from a specified server/CDN 206. However, in embodiments of the present invention, the client application 302 intercepts and acts as a proxy for such requests.

At step 406, the client application 302 retrieves/gets the master playlist from the server/network 206 and feeds the master playlist to the video player 304. FIG. 5A illustrates the details for step 406. Once playback is initiated (e.g., by the user 300), such a playback request specifies a server/CDN 206 (e.g., a server within a CDN 206) that the master playlist should be retrieved from. The client application 302 replaces that server/CDN 206 location with a media proxy 306 location and forwards the initiate playback request (that includes the media proxy 306 identifier/location) to the video player 304 at step 502. Once the initiate playback request has been received by the video player 304, the video player 304 issues a request to get the master playlist from the media proxy 306 at step 504. The media proxy 306 requests the master playlist via a "GET" command to the server/CDN 206 at step 506. The server/CDN 206 returns the master playlist to the media proxy 306 at step 508, and the media proxy 306 caches the master playlist locally at step 510. The master playlist is then returned to the video player at step 512.

As used herein, the master playlist may also be referred to as an extended M3U playlist that is downloaded at the start of a streaming session. Such a master playlist contains metadata for the various sub-streams that are available. More specifically, the M3U file is a plain text file that specifies the locations (i.e., the streaming source and/or an identifier of a particular stream) of one or more media files/streams along with information about the media file/stream (e.g., resolution, language, etc.). In other words, the master playlist identifies multiple streams, and for each of the multiple streams, the master playlist identifies a resolution and a playlist location for a playlist. Table A provides an example of an M3U file that may be retrieved by the media proxy 306.

TABLE A

EXTM3U
EXT-X-STREAM-INF:PROGRAM-
ID=1,BANDWIDTH=706731,SUBTITLES="subtitles",
RESOLUTION=480×270
http://...1/playlist.m3u8
EXT-X-STREAM-INF:PROGRAM-
ID=1,BANDWIDTH=79000,SUBTITLES="subtitles",
RESOLUTION=320×180
http://...2/playlist.m3u8
EXT-X-STREAM-INF:PROGRAM-
ID=1,BANDWIDTH=383583,SUBTITLES="subtitles",
RESOLUTION=480×270
http://...3/playlist.m3u8
EXT-X-STREAM-INF:PROGRAM-
ID=1,BANDWIDTH=1540000,SUBTITLES="subtitles",
RESOLUTION=592×336
http://...4/playlist.m3u8
EXT-X-STREAM-INF:PROGRAM-
ID=1,BANDWIDTH=1721000,SUBTITLES="subtitles",
RESOLUTION=768×432
http://...5/playlist.m3u8
EXT-X-STREAM-INF:PROGRAM-
ID=1,BANDWIDTH=2571000,SUBTITLES="subtitles",
RESOLUTION=880×496
http://...6/playlist.m3u8
EXT-X-STREAM-INF:PROGRAM-
ID=1,BANDWIDTH=3593000,SUBTITLES="subtitles",
RESOLUTION=1024×720
http://...7/playlist.m3u8
EXT-X-MEDIA:TYPE=SUBTITLES,GROUP-
ID="subtitles",NAME="ce1",DEFAULT=YES,FORCED=NO,
URI="http://....m3u8",LANGUAGE="en"
EXT-X-MEDIA:TYPE=SUBTITLES,GROUP-
ID="subtitles",NAME="ce3",URI="http://....m3u8",LANGUAGE="en"
EXT-X-MEDIA:TYPE=SUBTITLES,GROUP-
ID="subtitles",NAME="Service1",URI="http://....m3u8",
LANGUAGE="en"

In the #EXT-X-STREAM-INF tag/directive, the BANDWIDTH attribute specifies the bandwidth required for each stream. The RESOLUTION attribute contains two decimal integers separated by the "x" character. The first integer is a horizontal pixel dimension (width); the second is a vertical pixel dimension (height); which together identify the resolution of the stream. The web address identifies the uniform resource location (URL) of the playlist corresponding to that stream stream/file. Accordingly, the M3U file of Table A indicates that a particular program (identified as ID=1) is available from a first stream at a resolution of 480×270 with a playlist located at a first specified URL, from a second stream at a resolution of 320×180 with a playlist located at a second specified URL, from a third stream at a resolution of 480×270 with a playlist located at a third specified URL, from a fourth stream at a resolution of 592×336 with a playlist located at a fourth specified URL, etc.

Figure 5B:
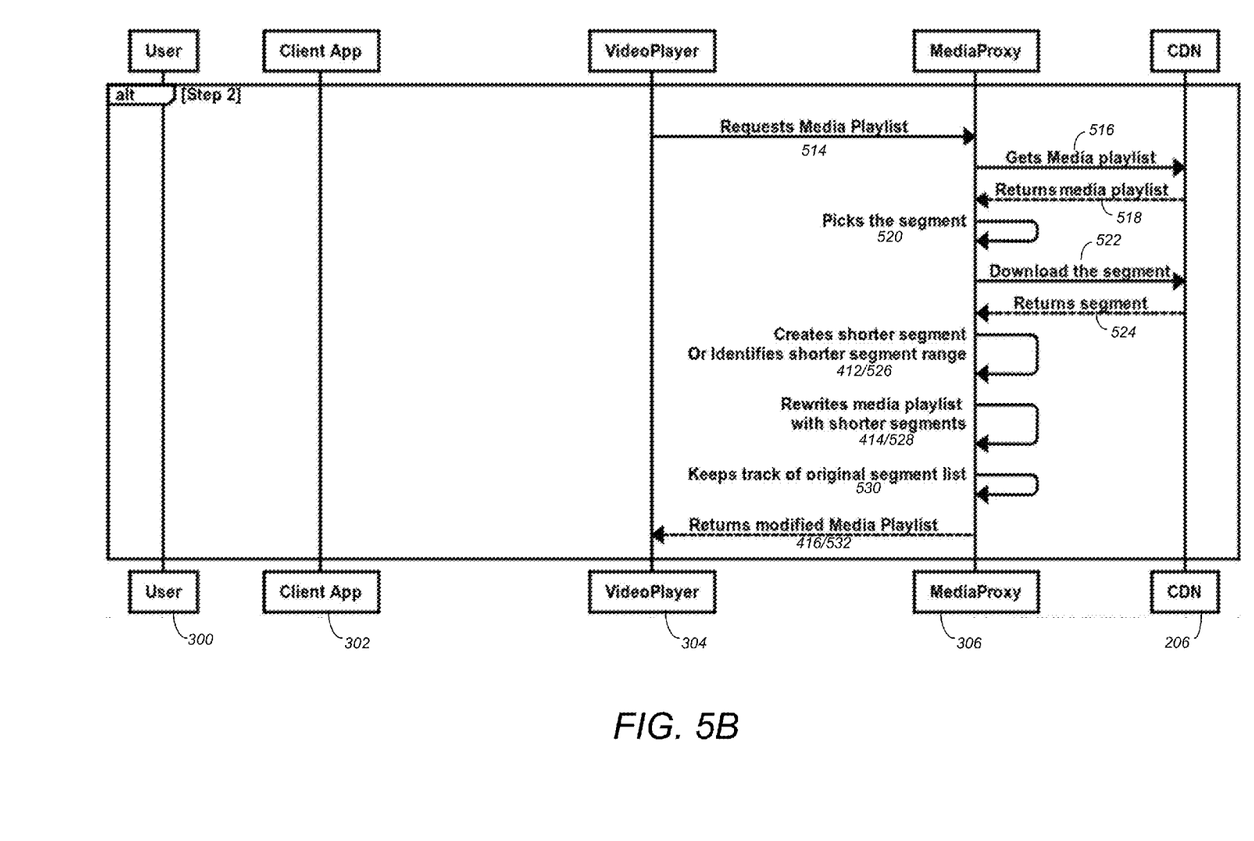
FIG. 5B illustrates the workflow for modifying a media playlist (steps 408-416 of FIG. 4) in accordance with one or more embodiments of the invention.

FIG. 5B illustrates the workflow for performing steps 408-416 of FIG. 4. At step 408 of FIG. 4 and step 514 of FIG. 5B, based on the bandwidth connection, the video player 304 requests a media playlist. In particular, the video player 304 examines the master playlist and determines which stream to request. If the bandwidth of the playback device is low (e.g., there is a relatively slow connection), the video player may elect to retrieve a lower resolution version of the media content. Thus, the video player 304 sends a playlist request, for one of the playlists in the master playlist, to the client application 302/media proxy 306.

The media proxy 306 receives the request for the media playlist from the video player 304, and at step 410, the client application (e.g., via the media proxy 306) downloads/ receives the media segment (from the server/CDN 206) and identifies the current chunk size. Referring to FIG. 5B, during step 410 of FIG. 4, the media proxy 306, issues a request for the media playlist at step 516 and is returned the media playlist at step 518.

The media playlist returned form the server/CDN 206 (i.e., at step 518) includes track information for each segment that includes the runtime (i.e., playback time) and title. An example of the media playlist returned at step 518 is illustrated in Table B:

TABLE B

```
#EXTM3U
EXT-X-TARGETDURATION:10
EXT-X-KEY:METHOD=AES-128,URI="8170110000080",
IV=xc39ecaae1d
#EXTINF:10,32.ts
#EXTINF:10,33.ts
EXTINF:10,34.ts
EXTINF:10,35.ts
EXTINF:10,36.ts
```

As illustrated in Table B, information following the directive/keyword #EXTINF includes the runtime (which is 10 seconds for each segment) and the title of each segment (e.g., 32.ts, 33.ts, 34.ts, 35.ts, and 36.ts).

Based on the media playlist, the media proxy 306 downloads the appropriate segment from the server/CDN 206 at step 410 (e.g., issues a request to download the segment at step 522, and is returned/downloads the segment at step 524). Step 410 also identifies the current chunk size of the downloaded segment/chunk.

As the media proxy 306 knows that the video player requires at least two segments before initiating playback, rather than delivering the media playlist that identifies a list of all of the segments with the predefined runtimes (e.g., 10 seconds), the media proxy 306 creates multiple shorter/smaller segments or identifies a shorter segment range at step 412/526. For example, at step 412/526 the media proxy 306 may make smaller segments (i.e., slice the original segment) from the original segment downloaded at step 410 (steps 522-524 of FIG. 5B).

Based on the shorter/sliced segments, the client application 302 (via the media proxy 306) rewrites the media playlist to reflect the newly created multiple smaller segments thereby producing a modified playlist at step 414/528. Table C illustrates an example of the playlist of Table B that has been modified by the media proxy 306 to indicate shorter segments.

TABLE C

```
#EXTM3U
EXT-X-TARGETDURATION:10
EXT-X-KEY:METHOD=AES-128,URI="8170110000080",
IV=0xc39ecaae1d
#EXTINF:2, // Segment duration is modified to indicate
2 seconds
32-1.ts    // This segment is the first slice created from 32.ts
#EXTINF:2,32-2.ts
#EXTINF:2,32-3.ts
EXTINF:2,32-4.ts
#EXTINF:2,32-5.ts   // This segment is the last slice created
from 32.ts
#EXTINF:10,33.ts    // Continue with 33.ts which is back
to 10 seconds
```

As illustrated in Table C, the first segment (i.e., segment 32) has been sliced into five 2-second segments instead of the single 10-second segment. The media playlist is modified changing the runtime after the EXTINF directive from 10 to 2. Further, the title of the segment has been changed from 32.ts to 32-1.ts. Each of the resulting five segments is similarly changed in the media playlist to indicate 2-second runtime segments and the titles have been changed to 32-1, 32-2, 32-3, 32-4, and 32-5. The 32-5 segment is the last slice created from the original 32.ts segment. Thereafter, the playlist returns to normal continuing with 10-second runtime segments and unchanged titles (e.g., 33.ts).

The media proxy 306 keeps track of the original segment list at step 530. At step 416/532, the client application 302 (via the media proxy 306) returns the updated/modified media playlist to the video player 304.

Figure 5C:
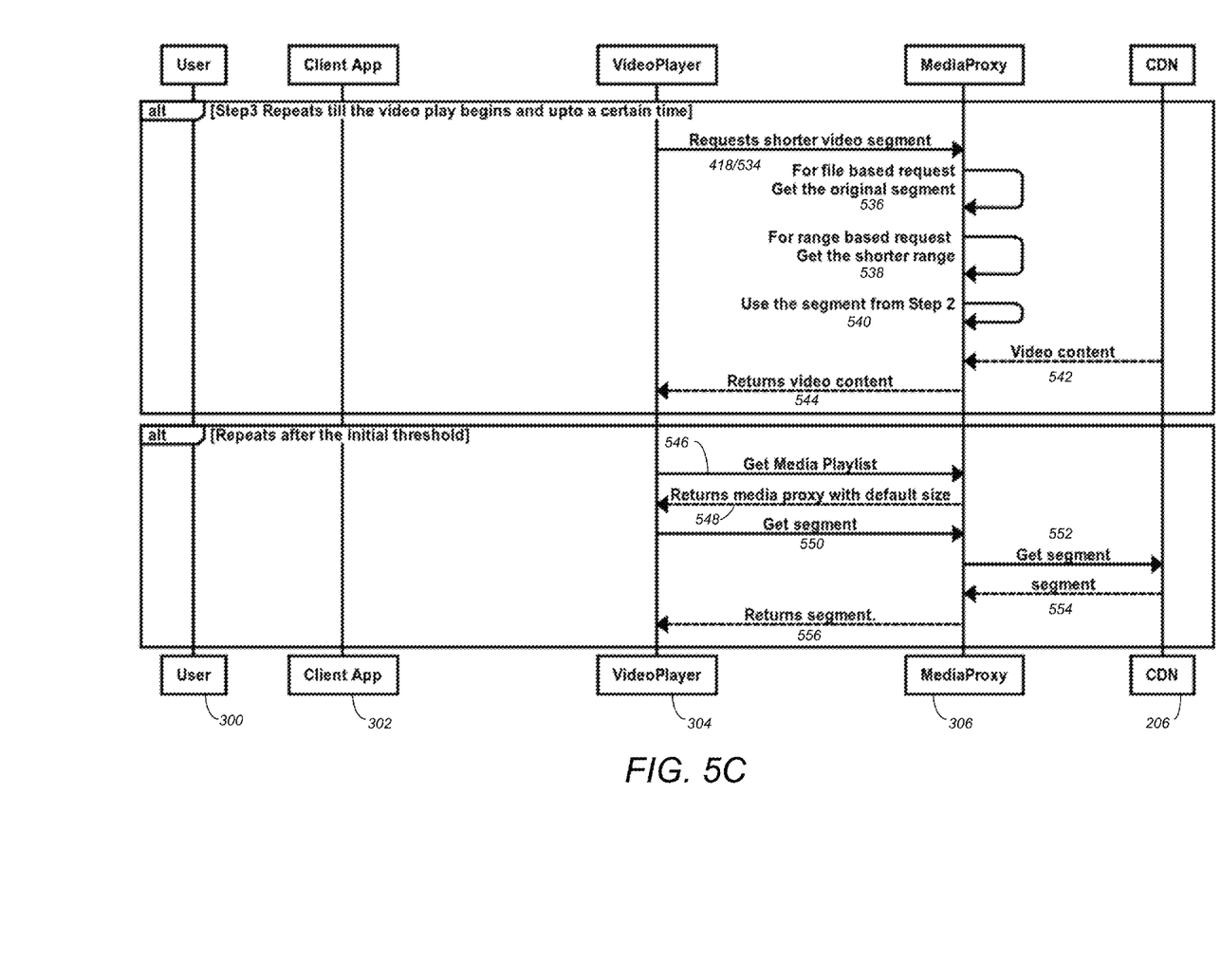
FIG. 5C illustrates the workflow for delivering sliced segments of media content to commence playback followed by increasing the size of segments (steps 418-422 of FIG. 4) in accordance with one or more embodiments of the invention.

FIG. 5C illustrates the workflow for performing steps 418-422 of FIG. 4. The steps in the upper half of FIG. 5C are repeated until the video play begins and up to a certain time. Once the modified media playlist has been received by the video player 304, the video player 304 requests one or more of the multiple new smaller slices of the segments at step 418/534 (i.e., based on the media playlist). Such a request is received by the media proxy 306. Steps 536-538 depend on the type of streaming protocol and/or type of request received from the video player 304. If the request is for a file (i.e., it is a file based request), an original segment may be used at the media proxy 306. If the request is a range based request, a shorter range may be used at step 538. At step 540, the shorter segment created at step 412/526 is used. Any additional video content necessary to comply with the video player 304 request may also be retrieved from the server/CDN 206 at step 542.

At step 420/544, the client application 302 (via the media proxy 306) returns the video content/multiple new slices. Steps 534-544 are repeated until the required number of segments and/or minimum amount of content is received by the video player 304. Thereafter, video playback begins at step 422. As described above, often times, it is the number of segments that are received (e.g., 2) that is relevant before a video player 304 begins playback. Rather than delivering the segments in the predefined size (e.g., a 10-second segment), embodiments of the invention provide the ability for the client 302 (via media proxy 306) to retrieve/download the first 10-second segment, slice the 10-second segment into multiple slices, and provide multiple slices to the video player 304 so that the video player 304 can commence playback. Consequently, if the slices comprise 2-second segments, playback can begin as soon as two 2-second segments are received by the video player 304. Thus, rather than having to wait to download two 10-second segments, embodiments of the invention only require the first segment to be downloaded before playback can begin—thereby reducing the delay before playback commencement significantly and often times more than by 50%. Consequently, the multiple smaller segments that are provided by the client application 302 (via the media proxy 306) to the video player 304 enable the video player 304 to commence playback of the media content.

Once the playback begins (i.e., the initial threshold for beginning playback has been reached), the original default segment size can be used. Further, since the video player 304 receives the runtimes of each segment (e.g., within the metadata/directives of the media playlist), the video player 304 will automatically request subsequent segments after receiving the initial segments. Referring again to FIG. 5C, once the initial segments in the modified playlist have been retrieved, or once the modified media playlist has been processed by the video player 304, the video player 304 requests the media playlist from the media proxy 306 at step 546. Since playback has already begun, the media playlist with the default size (i.e., the original segment size) is returned to the video player 304 at step 548. The media playlist is processed by the video player 304 resulting in a request for the next segment at step 550. The media proxy 306 issues the request for the segment to the server/CDN 206 at step 552 and the segment is returned to the media proxy 306 at step 554. The media proxy then returns the segment to the video player 304 for further playback at step 556.

Table D illustrates the media playlist once playback has begun:

TABLE D

EXTM3U
EXT-X-TARGETDURATION:10
EXT-X-KEY:METHOD=AES-128,URI="8170110000080",
IV=0xc39ecaae1d
EXTINF:2,32-3.ts
EXTINF:2,32-4.ts
EXTINF:2,32-5.ts
EXTINF:10,33.ts
EXTINF:10,34.ts As illustrated in Table D, the media playlist includes the sliced 2-second segments 32-3 through 32-5 and then continues with the segments of the predefined 10-seconds (i.e., segments 33 and 34). Once the segments in Table D are completely consumed, the media playlist would look like the original media playlist with different segment numbers as illustrated in Table E:

TABLE E

Figure 6:
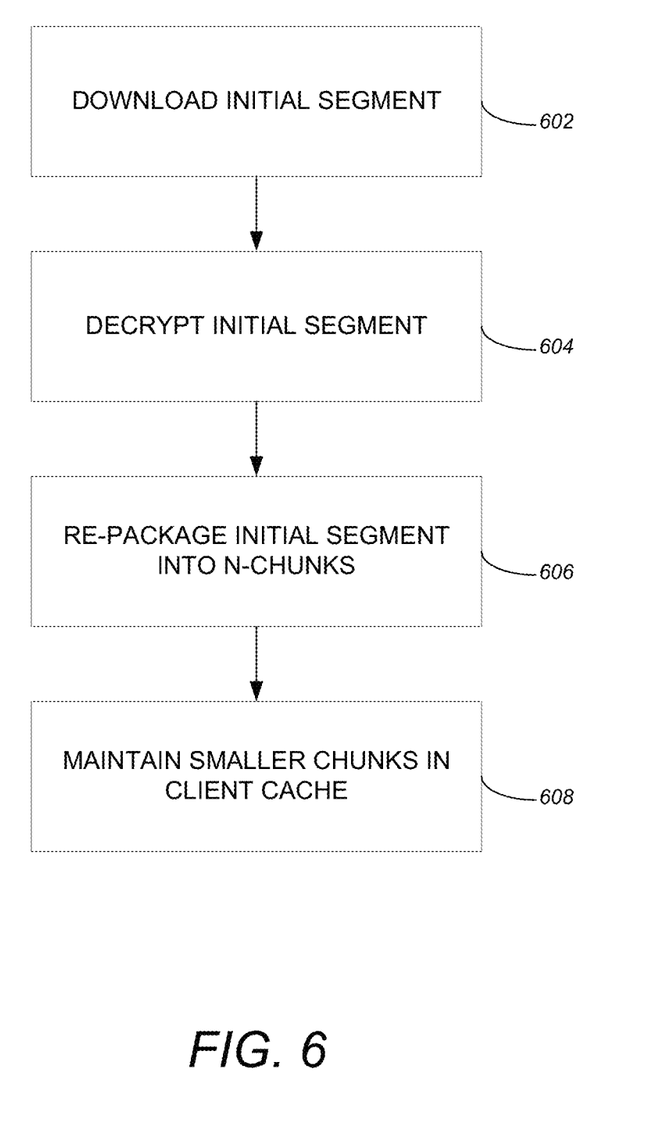
FIG. 6 illustrates the logical flow for the slicing of the segment (i.e., step 412/526 of FIGS. 4 and 5).

EXTM3U
EXT-X-TARGETDURATION:10
EXT-X-KEY:METHOD=AES-128,URI="8170110000080",
IV=0xc39ecaae1d
EXTINF:10,33.ts
EXTINF:10,34.ts
EXTINF:10,35.ts
EXTINF:10,36.ts
EXTINF:10,37.ts FIG. 6 illustrates the logical flow for the slicing of the segment (i.e., step 412/526 of FIGS. 4 and 5).

At step 602, the initial segment of the original pre-defined size is downloaded.

At step 604, the initial segment is decrypted using a decryption key. Such a key may be set forth in the media playlist or may be via HTTPS (HTTP Secure) or other encryption technique used to stream/broadcast media content.

At step 606, the initial segment is sliced and repackaged into N-number of smaller chunks. The number of chunks may be determined by the smallest chunk size that can be used to commence playback by a video player 304.

At step 608, the smaller chunks are maintained in the client cache and served if and when requested (e.g., by the video player 304).

In view of the above, one may note that the media proxy 306 is able to slice the original segment and revise the media playlist that are both provided to the video player 304 in real time dynamically on the client-side (e.g., by adjusting a byte range of the downloaded segment). Thus, no changes are needed to the server/CDN 206 or to the video player 304. Accordingly, with this approach, playback start time is reduced and becomes more responsive. As an example, in a typical 2.5 mbps download bandwidth situation, the average time taken to download a segment for 8-second playback time is around 3 seconds. If the player downloads 2 such segments, it takes nearly 6 seconds to begin playback. In contrast, using embodiments of the present invention, the latency from downloading the second segment is completely avoided prior to commencing playback, thereby saving that total time.

CONCLUSION

This concludes the description of the embodiments of the invention. The following describes some alternative embodiments for accomplishing the present invention. For example, any type of computer, such as a mainframe, minicomputer, or personal computer, tablet device, satellite distribution system, or computer configuration, such as a timesharing mainframe, local area network, or standalone personal computer, could be used with the present invention.

The foregoing description of embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for controlling media content playback comprising:
   receiving, in a client application, from a user, a playback request to initiate playback of media content;
   the client application receiving a master playlist from the server, wherein the master playlist identifies multiple streams, and for each of the multiple streams, the master playlist identifies a resolution and a playlist location for a playlist;
   the client application providing the master playlist to a video player;
   the client application downloading from a server, an original segment of the media content;
   the client application slicing the downloaded original segment into multiple smaller segments;
   the client application receiving a playlist request for one of the playlists in the master playlist;
   the client application retrieving the playlist in the playlist request from the server;
   the client application modifying the retrieved playlist to reflect the multiple smaller segments thereby producing a modified playlist;
   the client application returning the modified playlist to the video player, and
   the client application receiving a segment request from the video player for the one or more multiple smaller segments; and
   the client application providing one or more of the multiple smaller segments to the video player, wherein the one or more multiple smaller segments enable the video player to commence playback of the media content without the video player requiring the original segment.

2. The computer-implemented method of claim 1, wherein the server is within a content delivery network (CDN).

3. The computer-implemented method of claim 1, wherein the client application comprises a media proxy that acts as an interface to all network requests to/from the video player.

4. The computer-implemented method of claim 1, wherein the client application slices the original segment into the multiple smaller segments dynamically in real time.

5. The computer-implemented method of claim 1, further comprising:
returning a size of segments in the media content to an original segment size once playback of the media content commences.

6. The computer-implemented method of claim 1, further comprising:
maintaining the multiple smaller segments in a cache of the client application to serve to the video player when requested.

7. The computer-implemented method of claim 4, wherein the client application slices the original segment into the multiple smaller segments dynamically in real time by adjusting a byte range of the downloaded segment.

8. A system for controlling media content playback comprising:
a client application comprising a video player and a media proxy, wherein the client application:
receives, from a user, a playback request to initiate playback of media content; and
the media proxy:
receives a master playlist from the server, wherein the master playlist identifies multiple streams, and for each of the multiple streams, the master playlist identifies a resolution and a playlist location for a playlist;
the media proxy provides the master playlist to the video player;
downloads from a server, an original segment of the media content;
slices the downloaded original segment into multiple smaller segments;
receives a playlist request for one of the playlists in the master playlist,
retrieves the playlist in the playlist request from the server;
modifies the retrieved playlist to reflect the multiple smaller segments thereby producing a modified playlist;
returns the modified playlist to the video player; and
receives a segment request from the video player for the one or more multiple smaller segments; and
provides one or more of the multiple smaller segments to the video player, wherein the one or more multiple smaller segments enable the video player to commence playback of the media content without the video player requiring the original segment.

9. The system of claim 8, wherein the server is within a content delivery network (CDN).

10. The system of claim 8, wherein the media proxy acts as an interface to all network requests to/from the video player.

11. The system of claim 8, wherein the media proxy slices the original segment into the multiple smaller segments dynamically in real time.

12. The system of claim 8, wherein the media proxy:
returns a size of segments in the media content to an original segment size once playback of the media content commences.

13. The system of claim 8, wherein the media proxy:
maintains the multiple smaller segments in a cache to serve to the video player when requested.

14. The system of claim 11, wherein the media proxy slices the original segment into the multiple smaller segments dynamically in real time by adjusting a byte range of the downloaded segment.

15. A non-transitory computer readable storage medium encoded with computer program instructions which when accessed by a computer cause the computer to load the program instructions to a memory therein creating a special purpose data structure causing the computer to operate as a specially programmed computer, executing a method of controlling media content playback, comprising:
receiving, in a client application in the specially programmed computer, from a user, a playback request to initiate playback of media content;
the client application receiving a master playlist from the server, wherein the master playlist identifies multiple streams, and for each of the multiple streams, the master playlist identifies a resolution and a playlist location for a playlist;
the client application providing the master playlist to a video player;
the client application in the specially programmed computer, downloading from a server, an original segment of the media content;
the client application in the specially programmed computer, slicing the downloaded original segment into multiple smaller segments;
the client application receiving a playlist request for one of the playlists in the master playlist;
the client application retrieving the playlist in the playlist request from the server;
the client application modifying the retrieved playlist to reflect the multiple smaller segments thereby producing a modified playlist;
the client application returning the modified playlist to the video player; and
the client application receiving a segment request from the video player for the one or more multiple smaller segments, and
the client application in the specially programmed computer, providing one or more of the multiple smaller segments to the video player, wherein the one or more multiple smaller segments enable the video player to commence playback of the media content without the video player requiring the original segment.

16. The non-transitory computer readable storage medium of claim 15, wherein the server is within a content delivery network (CDN).

17. The non-transitory computer readable storage medium of claim 15, wherein the client application comprises a media proxy that acts as an interface to all network requests to/from the video player.

18. The non-transitory computer readable storage medium of claim 15, wherein the client application slices the original segment into the multiple smaller segments dynamically in real time.

19. The non-transitory computer readable storage medium of claim 15, further comprising:
returning a size of segments in the media content to an original segment size once playback of the media content commences.

20. The non-transitory computer readable storage medium of claim 15, further comprising:
maintaining the multiple smaller segments in a cache of the client application to serve to the video player when requested.

21. The non-transitory computer readable storage medium of claim 18, wherein the client application slices the original segment into the multiple smaller segments dynamically in real time by adjusting a byte range of the downloaded segment.

\* \* \* \* \*